United States Patent
Unno

(10) Patent No.: US 8,616,830 B2
(45) Date of Patent: Dec. 31, 2013

(54) HYDRAULIC POWER GENERATING APPARATUS

(76) Inventor: Yuji Unno, Tokyo (JP)

(*) Notice: Subject to any disclaimer, the term of this patent is extended or adjusted under 35 U.S.C. 154(b) by 0 days.

(21) Appl. No.: 13/390,363

(22) PCT Filed: Sep. 1, 2011

(86) PCT No.: PCT/JP2011/069889
§ 371 (c)(1),
(2), (4) Date: Feb. 14, 2012

(87) PCT Pub. No.: WO2012/157131
PCT Pub. Date: Nov. 22, 2012

(65) Prior Publication Data
US 2012/0294705 A1 Nov. 22, 2012

(30) Foreign Application Priority Data
May 18, 2011 (JP) .................... 2011-111809

(51) Int. Cl.
*F03B 7/00* (2006.01)
*F03B 15/14* (2006.01)

(52) U.S. Cl.
USPC ............ 415/4.2; 415/158; 290/43; 290/54

(58) Field of Classification Search
USPC ............ 290/43, 54; 415/4.2, 4.4, 158, 173.1, 415/126, 127, 147, 151, 157
See application file for complete search history.

(56) References Cited

U.S. PATENT DOCUMENTS

| | | | | | |
|---|---|---|---|---|---|
| 419,345 | A | * | 1/1890 | Otto | 415/4.2 |
| 1,326,769 | A | * | 12/1919 | Munn | 415/151 |
| 1,487,391 | A | * | 3/1924 | Kochlin | 405/78 |
| 2,072,930 | A | * | 3/1937 | Voorduin | 405/78 |
| 4,203,702 | A | * | 5/1980 | Williamson | 415/60 |
| 4,606,697 | A | * | 8/1986 | Appel | 415/4.4 |
| 4,998,846 | A | * | 3/1991 | Evstratov et al. | 405/78 |
| 5,032,038 | A | * | 7/1991 | Lemperiere | 405/108 |
| 5,850,108 | A | * | 12/1998 | Bernard | 290/54 |
| 6,849,964 | B2 | * | 2/2005 | Becherucci et al. | 290/55 |
| 2010/0096856 | A1 | * | 4/2010 | Janca et al. | 290/52 |
| 2010/0213720 | A1 | * | 8/2010 | Bailey et al. | 290/55 |

FOREIGN PATENT DOCUMENTS

| | | | |
|---|---|---|---|
| JP | 56138466 A | 10/1981 | |
| JP | 2007177797 A | 7/2007 | |
| JP | 2009114937 A | 5/2009 | |
| JP | 2010031791 | * 2/2010 | F03B 1/00 |
| JP | 2010031791 A | 2/2010 | |

* cited by examiner

*Primary Examiner* — Nathaniel Wiehe
*Assistant Examiner* — Joshua R Beebe
(74) *Attorney, Agent, or Firm* — Brooks Kushman P.C.

(57) ABSTRACT

The apparatus includes a water collecting plate 6 which collects water into a water inflow opening 8 while intercepting and accumulating water flowing through a waterway, and a movable gate 5 which is capable of changing flow cross-sectional area of water flow acting to the top ends of rotor blades 33 of a vertical axis turbine 3 as inflowing from the water inflow opening 8. Here, owing to changing of flow cross-sectional area with opening and closing of the movable gate 5, a flow rate can be adjusted by changing a water level at the upstream side and opening area of an orifice hole and operation of the rotor blades 33 can be stopped by blocking water passing toward the vertical axis turbine 3.

16 Claims, 14 Drawing Sheets

(a)

(b)

(a)

(b)

(a)

(b)

(a)

(b)

(a)

(b)

(a)

(b)

HYDRAULIC POWER GENERATING APPARATUS

CROSS-REFERENCE TO RELATED APPLICATION

This application is the U.S. national phase of PCT Appln. No. PCT/PCT/JP2011/069889 filed Sep. 1, 2011 which claims priority to Japanese application JP 2011-111809 filed May 18, 2011, the disclosures of which are incorporated in their entirety by reference herein.

TECHNICAL FIELD

The present invention relates to a hydraulic power generating apparatus capable of generating power by utilizing water flow.

BACKGROUND ART

The inventor has developed a hydraulic power generating apparatus described in Patent literature 1 generating power by utilizing water flow as being installed to a river, an artificial waterway or the like. Such a hydraulic power generating apparatus starts to be installed to a small river and a first-class river.

Owing to power generation performed by utilizing small hydraulic power such as flow in a river, the hydraulic power generating apparatus has been a nonconventional breakthrough apparatus capable of performing hydraulic power generation effectively at low cost.

However, newly-required improvement points have appeared through actual installation of the hydraulic power generating apparatus. The required improvement points mainly include the following two issues.

One is a problem of maintenance. Since the hydraulic power generating apparatus performs hydraulic power generation as being installed to a waterway having flow, a turbine continues to be rotated once installed as long as water of a river or the like is not dried up. The hydraulic power generating apparatus has an advantage in a point of performing power generation by utilizing water flow which naturally occurs. Here, periodic maintenance is inevitably required to maintain performance thereof. If maintenance is to be performed, it is required to intercept water flow or to perform operation at land after the hydraulic power generating apparatus is lifted from a waterway with a crane and the like. Thus, there is a problem that maintenance requires great care.

The other is a problem of water level fluctuation. There is flow rate fluctuation in a waterway itself corresponding to an irrigation period, a non-irrigation period, a rainy season or a dry season. Since the hydraulic power generating apparatus is installed to a place having water flow such as a river and agricultural waterway, water flow is intercepted to some extent and water level fluctuation occurs at the upstream side and the downstream side. Further, since the power generation amount depends on the water level at the upstream side, there arises difference in power generation amount between a rainy season having a large amount of water and a dry season having a small amount of water. Accordingly, there has been a possible problem that stable power generation cannot be performed.

CITED LITERATURE

Patent Literature

Patent literature 1: Japanese Patent Application Laid-Open No. 2007-177797

DISCLOSURE OF THE INVENTION

Problems to be Solved by the Invention

To address the above issues, the purpose of the present invention is to provide a hydraulic power generating apparatus capable of adjusting a water level at the upstream side and supplying a stable power generation amount with easy maintenance.

Solution to the Problems

In order to achieve the above purpose, according to the present invention, there is provided a hydraulic power generating apparatus to perform power generation as being installed in a waterway having flow, including: a housing which includes a water inflow opening located at the upstream side of the waterway, a water outflow opening located at the downstream side thereof, and a flow path providing communication from the water inflow opening to the water outflow opening; a water collecting plate which is disposed to an opening edge of the water inflow opening of the housing and which collects water into the water inflow opening while intercepting and accumulating water flowing through the waterway; a vertical axis turbine which is rotatably supported in the flow path of the housing as having rotor blades; a generator which generates power as receiving rotational force of the vertical axis turbine; and a movable gate which is capable of adjusting a water level of accumulated water at the upstream side of the waterway by changing flow cross-sectional area of water flow acting to a rotor blade top end of the vertical axis turbine as inflowing from the water inflow opening.

In the hydraulic power generating apparatus according the present invention, the movable gate is configured to change the flow cross-sectional area by being opened and closed in a direction perpendicular to the flow path or to change the flow cross-sectional area by being opened and closed along an outer circumference of the rotor blades and by being attached to a rotating shaft of the vertical axis turbine.

The hydraulic power generating apparatus according to present invention may include an acceleration plate which accelerates water flow in the flow path by gradually reducing opening area of the water inflow opening and by being arranged upright in the housing.

Here, the acceleration plate being a sluice gate capable of being lifted in the vertical direction, a slide gate capable of being opened and closed in the horizontal direction or a rotary gate capable of being rotated about a vertical axis may be configured to be capable of discharging water in the flow path from a discharge hole formed at the housing to the outside of the housing by opening the gate.

Further, an open-close door may be disposed to the water collecting plate to be capable of discharging overflow water at the upstream side of the waterway to the downstream side without passing through the flow path by opening the open-close door. Here, the vertical axis turbine can adopt a single axis cross-flow turbine or oppositely-arranged dual axis cross-flow turbines.

Effects of the Invention

The hydraulic power generating apparatus of the present invention particularly includes the water collecting plate which collects water into the water inflow opening while intercepting and accumulating water flowing through the waterway, and the movable gate which is capable of changing flow cross-sectional area of water flow acting to the rotor blade top end of the vertical axis turbine as inflowing from the water inflow opening. Therefore, the water level at the upstream side and the opening area of the orifice hole can be adjusted by changing the flow cross-sectional area owing to opening and closing of the movable gate. Accordingly, it is possible to have a flow rate adjusting function without lowering a power generation efficiency. Thus, there arises an effect that stable hydraulic power generation can be continuously performed without depending on water level fluctuation in the waterway. Further, since rotor blade operation can be stopped as blocking water passing toward the vertical axis turbine by completely closing the movable gate, there also arises an effect that maintenance operation can be easily performed.

BRIEF DESCRIPTION OF THE DRAWINGS

FIG. 17 illustrates another embodiment of the present invention while FIG. 17 (a) is a plane view illustrating positional relation between a gear and a movable gate and FIG. 17(b) is a cross-sectional view at C-C.

BEST MODE FOR CARRYING OUT THE INVENTION

In the following, preferable embodiments of the present invention will be described in detail with reference to the attached drawings.

Figure 1:
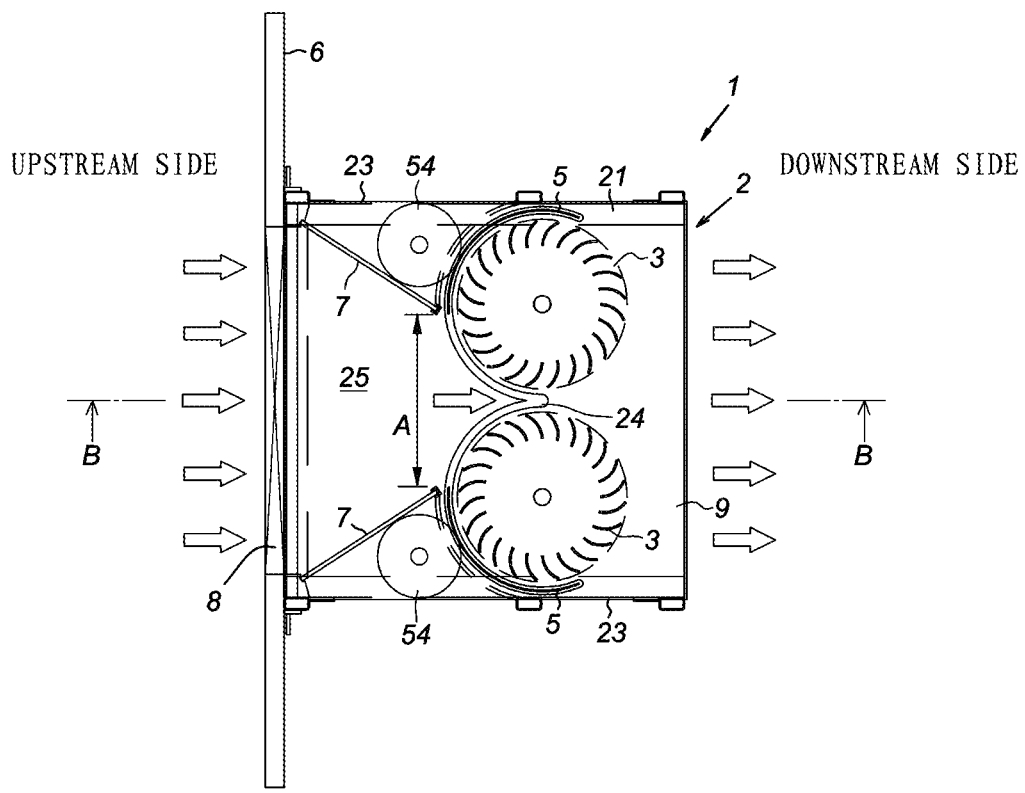
FIG. 1 is a plane view illustrating an embodiment of a hydraulic power generating apparatus according to the present invention.
Figure 2:
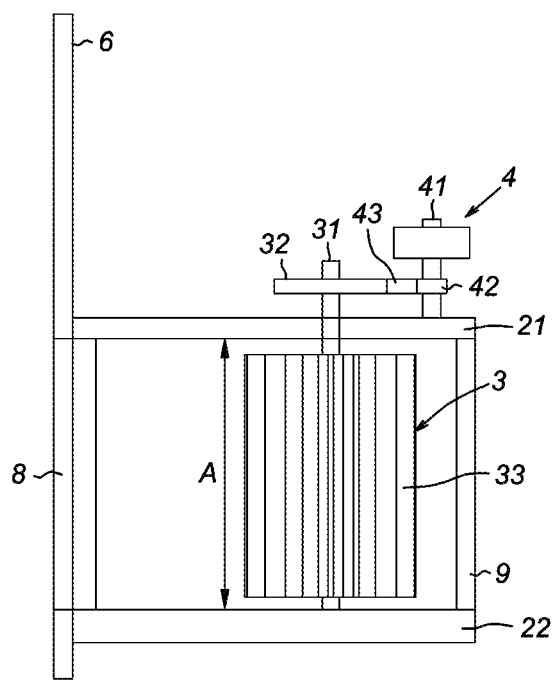
FIG. 2 is a cross-sectional view at B-B of FIG. 1.
Figure 3:
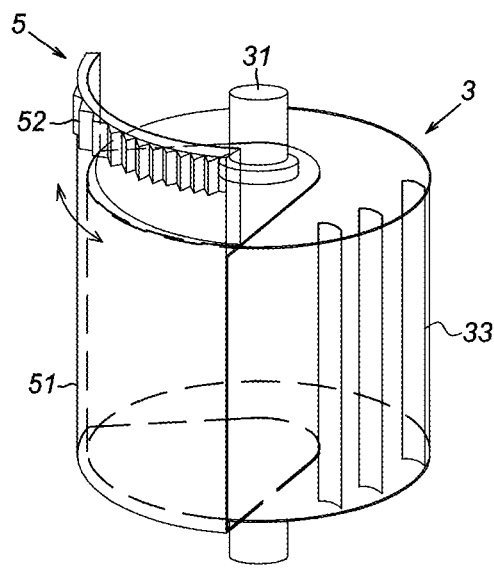
FIG. 3 is a perspective view illustrating a structure of a vertical axis turbine disposed to the hydraulic power generating apparatus of FIG. 1.
Figure 4:
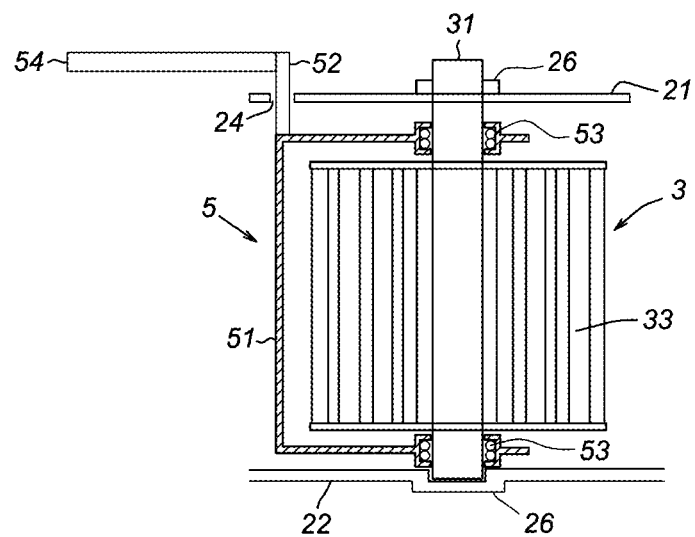
FIG. 4 is a cross-sectional view illustrating the structure of the vertical axis turbine disposed to the hydraulic power generating apparatus of FIG. 1.

FIG. 1 is a plane view illustrating an embodiment of a hydraulic power generating apparatus according to the present invention. Here, for facilitating visualization for each structure, FIG. 1 include omission in part on a generator 4, pulleys 32, 42, a belt 43 and a drive shaft 41. FIG. 2 is a cross-sectional view at B-B of FIG. 1. Here, a gear 54, a movable gate 5 and an acceleration plate 7 are omitted for clarifying each structure. FIG. 3 is an explanatory cross-sectional view of a structure of a vertical axis turbine 3 disposed to a hydraulic power generating apparatus 1 as being simplified for clarifying positional relation between the movable gate 5 and the vertical axis turbine 3. FIG. 4 is an explanatory perspective view of a structure of the vertical axis turbine 3 disposed to the hydraulic power generating apparatus 1.

As illustrated in FIG. 1, the hydraulic power generating apparatus 1 includes a housing 2 having a water inflow opening 8, a water outflow opening 9 and a flow path 25 providing communication from the water inflow opening 8 to the water outflow opening 9. The hydraulic power generating apparatus 1 is used as being installed such that the water inflow opening 8 is located to the upstream side of a waterway having flow and the water outflow opening 9 is located at the downstream side thereof.

As illustrated in FIG. 2, the hydraulic power generating apparatus 1 includes a vertical axis turbine 3 which is rotatably supported in the flow path 25 of the housing 2 as having a plurality of rotor blades 33, 33, . . . (hereinafter, simply called the rotor blades 33), a generator 4 which generates power as receiving rotational force of the vertical axis turbine 3, a movable gate 5 which is capable of changing flow cross-sectional area A of water flow acting to a top end of the rotor blades 33 of the vertical axis turbine 3 as inflowing from the water inflow opening 8, and a water collecting plate 6 which intercepts and accumulates water flowing through the waterway and collects the accumulated water into the water inflow opening 8 when installed as being sunk in the waterway.

The housing 2 is structured with a top plate 21, a bottom plate 22 and two side plates 23, 23 and includes the water inflow opening 8 opened to the upstream side and the water outflow opening 9 opened to the downstream side. Two arc-shaped slide grooves 24 are formed at the top plate 21. The movable gate 5 is configured to be movable in an arrow direction in the drawing as being guided by the slide groove 24 in a state that a tooth portion 52 (see FIG. 3) is inserted thereto.

The flow path 25 providing communication from the water inflow opening 8 to the water outflow opening 9 is formed in the housing 2. The vertical axis turbines 3, 3 arranged oppositely are accommodated in the flow path 25. The vertical axis turbine 3 of the present embodiment is a cross-flow turbine which includes a rotating shaft 31 and the plurality of rotor blades 33. The rotating shaft 31 is rotatably supported by bearings 26, 26 formed at the top plate 21 and the bottom plate 22 (see FIG. 4). Here, although cross-flow turbines are utilized as the vertical axis turbines 33, 33 in the present embodiment, alternatives can be adopted as long as being turbines of a vertical axis type.

In the generator 4, a pulley 42 attached to a drive shaft 41 thereof is connected to a pulley 32 attached to the rotating shaft 31 with a belt 43. The generator 4 is configured to perform power generation while rotational force caused by rotation of the rotating shaft 31 of the vertical axis turbine 3 is transmitted to the drive shaft 41 via the belt 43. The generator 4 is attached to the vertical axis turbines 3, 3 one each.

The movable gate 5 is a sector gate (i.e., a radial gate) of a type in which two arc-shaped gate doors are rotated having a shaft as a fulcrum. The gate is rotatably supported by the rotating shaft 31 of the vertical axis turbine 3 and is provided with an arc-shaped main body portion 51 attached to the rotating shaft 31 via bearings 53, 53, and an arc-shaped tooth portion 52 disposed to the main body portion 51. A tooth profile for being engaged with a gear 54 is formed at an outer circumference of an upper part of the tooth portion 52.

The water collecting plate 6 for intercepting and accumulating water at the upstream side flowing through the waterway is formed integrally or separated at an opening edge of the water inflow opening 8. In the hydraulic power generating apparatus 1 of the present invention, the accumulated water is passed into the housing 2 from the water inflow opening 8 while accumulating intercepted water by the water collecting plate 6. Accordingly, the flow cross-sectional area A of an opening section adjusted by the movable gate 5 is to be an opening area of an orifice hole. A flow rate acting to the vertical axis turbine 3 is determined by the opening area of the orifice hole and a water level H of water accumulated at the upstream side as being collected by the water collecting plate 6.

Further, the acceleration plates 7, 7 arranged oppositely as illustrated in FIG. 1 are disposed in the housing 2. Water flow in the flow path 25 is to be accelerated by gradually reducing opening area of the water inflow opening 8 by the acceleration plates 7, 7. The acceleration plates 7, 7 of the present embodiment are structured with a lift type sluice gate. Here, vertical lifting thereof produces interspace against the bottom plate 22 and water in the flow path 25 can be discharged through the interspace.

Figure 5:
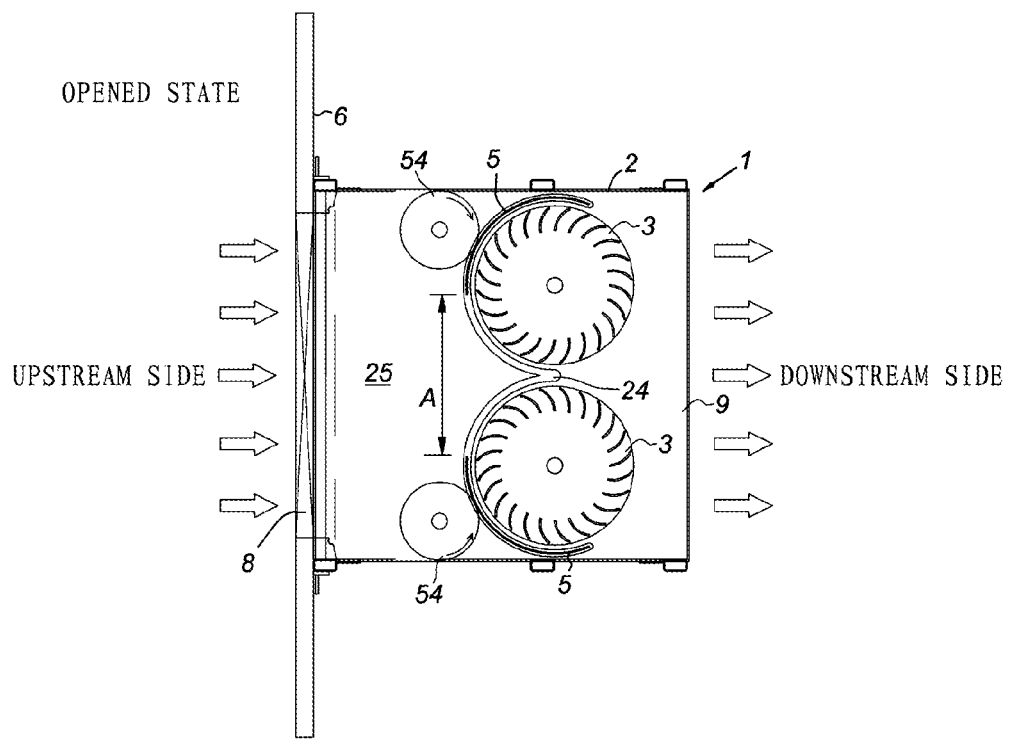
FIG. 5 is a plane view illustrating operation (i.e., an opened state and a closed state) of a movable gate of the hydraulic power generating apparatus of FIG. 1.
Figure 5:
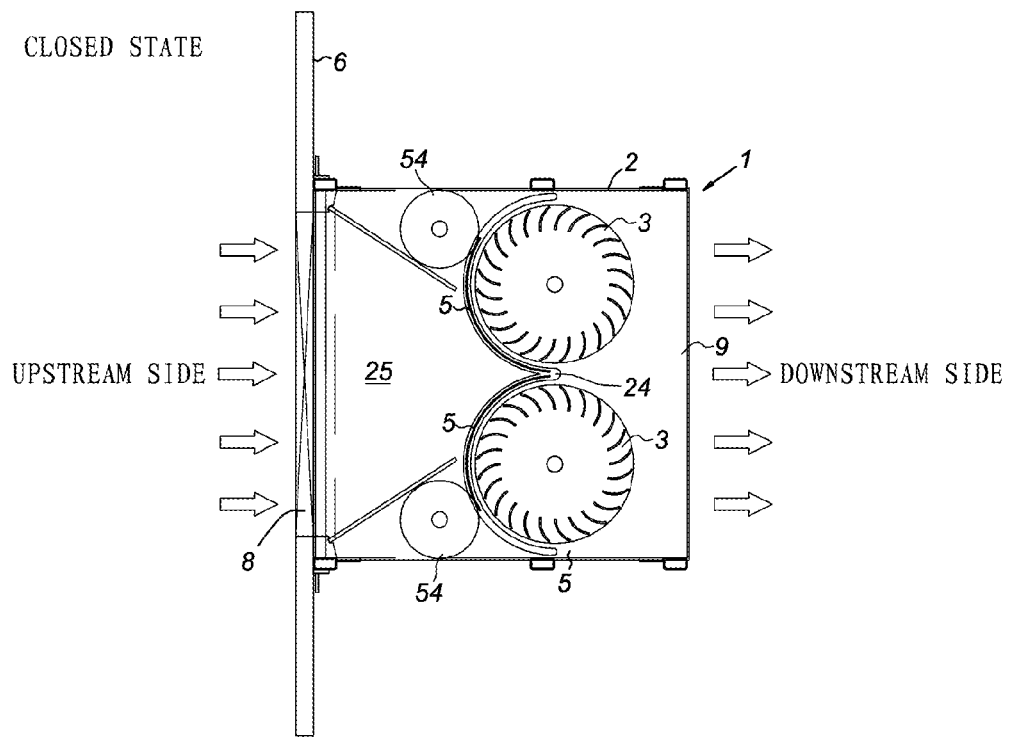

Next, operation of the movable gate 5 in the hydraulic power generating apparatus 1 as structured above will be described with reference to FIG. 5. FIG. 5 is an explanatory view for operation of the hydraulic power generating apparatus 1. FIG. 5 (a) illustrates a state that the movable gates 5, 5 are opened and FIG. 5 (b) illustrates a state that the movable gates 5, 5 are closed. Here, for clarifying the state of the movable gates 5, 5, the acceleration plates 7, 7 and other structures are not illustrated.

As illustrated in FIG. 5 (a), when the movable gates 5, 5 are in a fully-opened state, the flow cross-sectional area at that time, that is, the opening area of the orifice hole is A. In the following, a state of the opening area of the orifice hole is indicated by A with a numeral suffix as the orifice hole being denoted by the flow cross-sectional area A.

To change into the closed state illustrated in FIG. 5 (b) from the above state, it is simply required to rotate the two gears 54, 54 respectively in an arrow direction illustrated in FIG. 5 (a). Then, the tooth portions 52, 52 engaged respectively with the gears 54, 54 is moved toward the center part along the outer circumference of the vertical axis turbines 3, 3 in the slide groove 24 as being interlocked with the rotation. When the movement is completed to the end, inner top ends of the tooth portions 52, 52 are closed to each other. This state is the closed state. In this state, the opening area of the orifice hole becomes approximately to zero and water passing toward the vertical axis turbines 3, 3 is blocked. Thus, the rotational operation of the rotor blades 33 can be stopped. Provided that maintenance operation of the vertical axis turbines 3, 3 is performed in this state, it is not required to lift the hydraulic power generating apparatus 1 to land with a crane and the like. Therefore, the maintenance operation can be easily performed. When the gears 54, 54 are rotated respectively in the direction opposite to the arrow direction of FIG. 5(a) after the maintenance operation is completed, the movable gates 5, 5 can be moved in the direction toward the outer side (i.e., toward the side plates 23, 23) along the outer circumference of the vertical axis turbines 3, 3. Here, not limited to the above, the movable gates 5 may be configured to change the flow cross-sectional area owing to opening and closing with movement in the direction perpendicular to the flow path 25.

In the hydraulic power generating apparatus 1 of the present invention, the opening area of the orifice hole can be adjusted by utilizing the movable gates 5, 5 as described above. According to the principle of an orifice, the water flow rate passed to the vertical axis turbines 3, 3 seems to be decreased with lessening of the opening area of the orifice hole to cause rotational force reduction of the vertical axis turbines 3, 3. However, the fact is that the above does not occur according to the present invention. The principle thereof will be described on the basis of FIG. 6.

Figure 6:
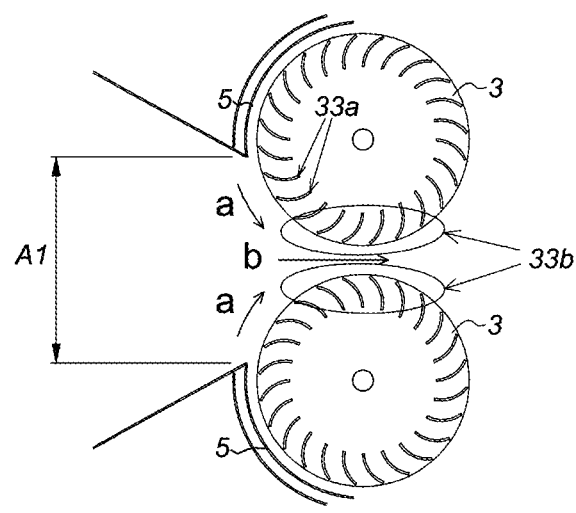
FIG. 6 is an explanatory schematic view for relation between an orifice hole and the vertical axis turbine of the hydraulic power generating apparatus of FIG. 1.
Figure 6:
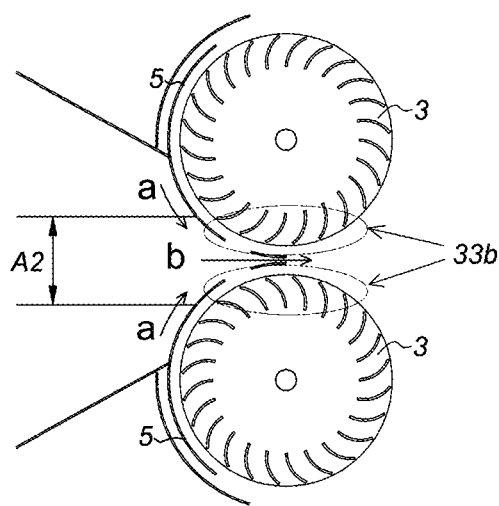

FIG. 6 is an explanatory schematic view for relation between the orifice hole and the vertical axis turbines 3, 3 of the hydraulic power generating apparatus 1. FIG. 6(a) illustrates that the opening area of the orifice hole is A1 and FIG. 6(b) illustrates that the opening area of the orifice hole is A2.

In a state of FIG. 6(a), water passed to the vertical axis turbines 3, 3 passes through the opening portion of the orifice hole having the opening area A1. The rotor blades which guide water flow a out of the water flow passing therethrough to the center between both of the vertical axis turbines 3, 3 are rotor blades 33a illustrated in FIG. 6(a). Meanwhile, the rotor blades which predominantly contribute to the rotation of both of the vertical axis turbines 3, 3 are rotor blades 33b in the same drawing. That is, the rotational force of the vertical axis turbines 3, 3 depends on the flow rate of water which directly collides with the top ends of the rotor blades 33b.

In contrast, in a state of FIG. 6(b), that is, a state that the opening area of the orifice hole is set to be A2 which is smaller than A1 by moving the movable gates 5, 5 in the closing direction, water flow passes through the opening portion having the opening area A2. In this case, although the opening area of the orifice hole becomes small, the amount of water directly flowing to the top ends of the rotor blades 33b remains almost the same. Thus, in the hydraulic power generating apparatus 1 of the present invention, it is possible to have little influence against the rotational force of the vertical axis turbines 3, 3 even if the opening area of the orifice hole is lessened. Accordingly, hydraulic power generation can be stably performed while adjusting the water level at the upstream side. The reason thereof will be described in the following with reference to FIGS. 7 to 15.

Figure 8:
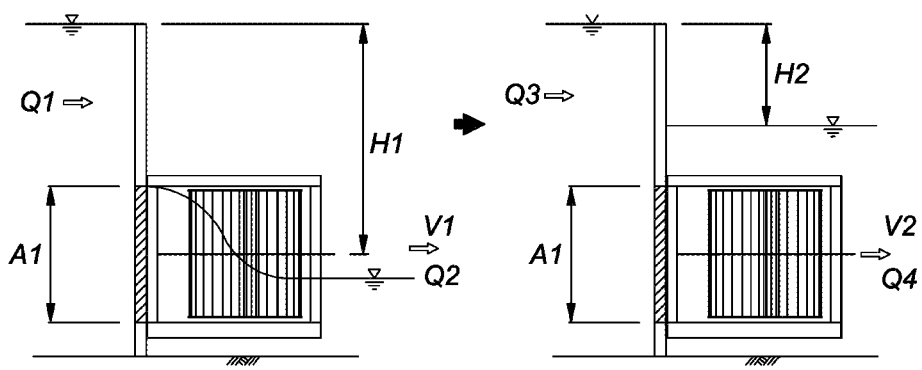
FIG. 8 is an explanatory view for relation among an upstream side flow rate, a discharge flow rate from the orifice hole, and the effective water level difference as simplifying the hydraulic power generating apparatus of FIG. 2.
Figure 9:
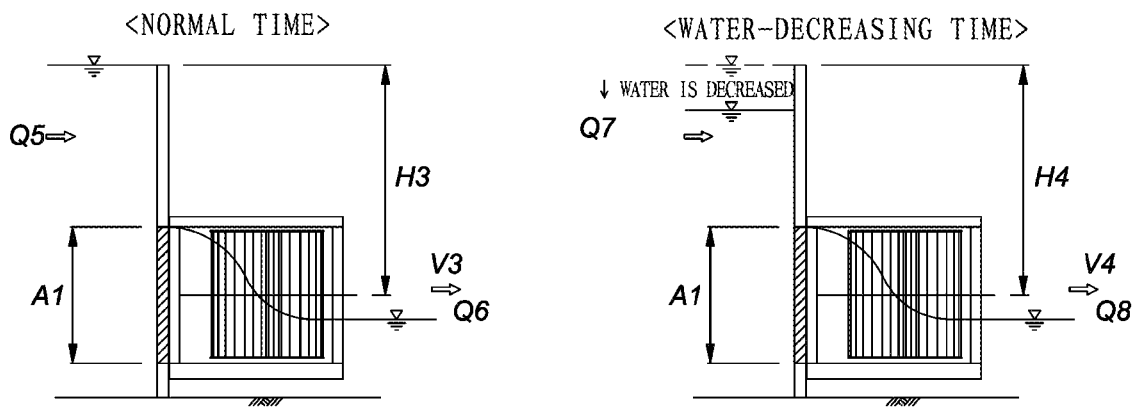
FIG. 9 is an explanatory view for correlative relation of variation of a flow rate from the upstream side with variation of the flow speed and the effective water level difference, and variation of a power generation amount.
Figure 10:
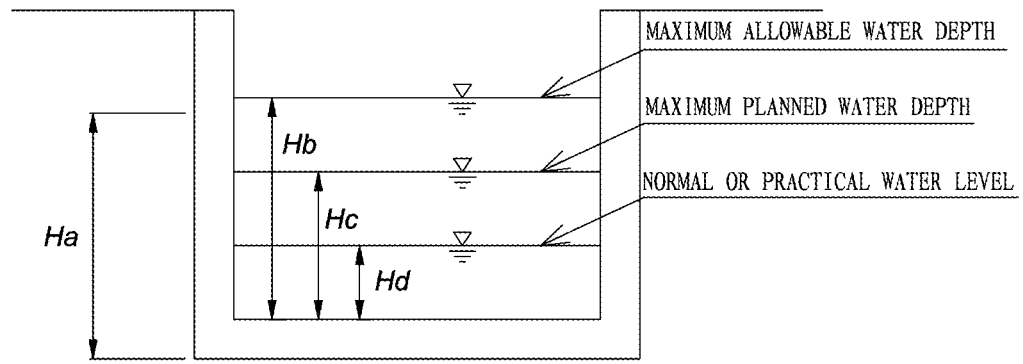
FIG. 10 is an explanatory view for a water level of a general waterway.

All of FIGS. 7 to 15 except FIG. 10 are views obtained by simplifying FIG. 2. Here, the drawings illustrate relation between the accumulated water level at the upstream side and the flow rate and flow speed of water flowing from the orifice hole while accumulating water at the upstream side by the water collecting plate 6.

Figure 7:
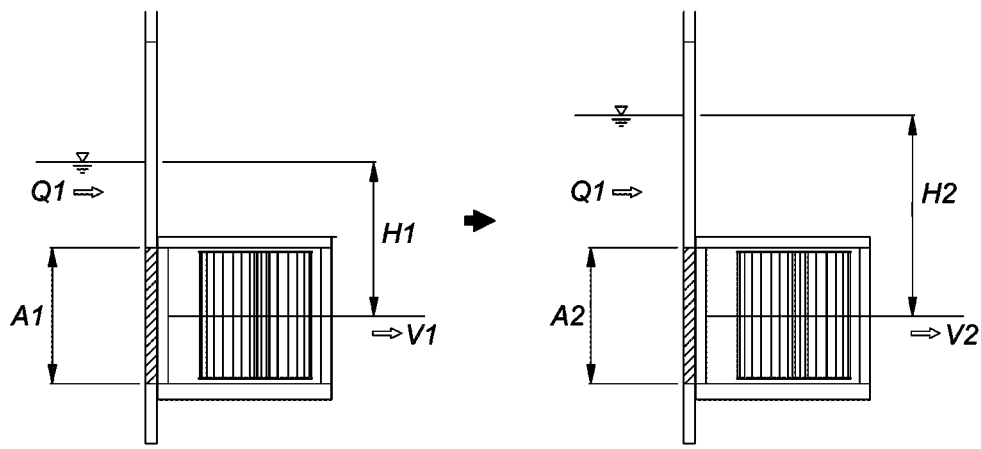
FIG. 7 is an explanatory view for relation among flow speed, opening area of the orifice hole, effective water level difference, and a flow rate as simplifying the hydraulic power generating apparatus of FIG. 2.

Taking FIG. 7 as an example for description, flow speed V1 is indicated by the following expression as Q1, H1, V1, A1 and g respectively denoting the flow rate from the upstream side, effective water level difference, flow speed of water flow discharged from the orifice hole, the opening area of the orifice hole, and gravity acceleration.

$$V_1 = \sqrt{2gH_1}$$

Here, the above consideration is performed as excluding striction of Vena Contracta.

Denoting the flow rate discharged from the orifice hole by Q1, the flow rate Q1 is indicated by the following expression.

$$Q_1 = A_1\sqrt{2gH_1}$$

Accordingly, if the flow rate from the upstream side and the discharge flow rate from the orifice hole are both Q1, the effective water level can be adjusted by adjusting the opening area of the orifice hole, as illustrated in FIG. 7.

On the other hand, in a case that the flow rate from the upstream side varies, the effective water level difference can be kept constant by adjusting the opening area of the orifice hole.

By the way, an important point of hydraulic power generation at a waterway is that the flow rate from the upstream side and the flow rate discharged from the orifice hole are required to be the same to obtain maximum power generation. For example, as illustrated in FIG. 8, if flow rates Q1, Q3 from the upstream side are smaller than flow rates Q2, Q4 discharged from the orifice hole, the effective water level differences H1, H2 are decreased. On the other hand, if Q1 and Q3 are larger, the effective water level differences H1, H2 are increased.

It is a rare case that a waterway has a constant water amount through a whole year. Specifically, it is normal that the water amount for agricultural use fluctuates approximate 2 to 5 times between a non-irrigation period and an irrigation period. Here, the water amount variation influences to the flow speed V of the water flow discharged from the orifice hole and the effective water level difference H.

Correlative relation of the variation of the flow rate from the upstream side with the variation of the flow speed V and the effective water level difference H, and further, with variation of a power generation amount W=QgH will be described with reference to FIG. 9.

A power generation amount W1 at normal time is expressed as W1=Q5×g×H3. On the other hand, when the flow rate from the upstream is decreased, decrease of H4 and V4 occurs if the opening area of the orifice hole cannot be adjusted.

Here, description is performed on a water level of a general waterway with reference to FIG. 10. As primary waterway functions, a waterway cross-sectional shape and a waterway gradient are determined corresponding to a planned water amount. In general, purposes and conditions of a planned waterway are set and a waterway cross-sectional shape is designed to satisfy the conditions, that is, to satisfy planned flow rates (i.e., the maximum and minimum rates) of the target waterway to be designed and water depth Hc of the planned flow amount (i.e., the maximum value). In general, Hb is set to be 80% of Ha in water depth. The waterway cross-section and waterway gradient are determined on the basis of Manning formula and Kutter formula which are hydrologic formulas. In general, the flow speed in the waterway is set to have mean flow speed being approximately between 1.2 m/sec and 1.5 m/sec. In addition, it is common that the flow speed in the waterway is designed to be fast toward the downstream side. It is an essential factor for waterway power generation to concomitantly use power generation equipment while maintaining functions of the waterway.

Figure 11:
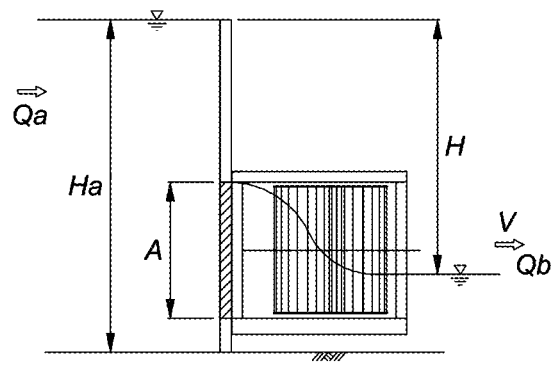
FIG. 11 illustrates a state that an effective water level H, flow speed V, and a discharge flow rate Qb from the orifice hole are obtained in conditions having a flow rate Qa from the upstream side, an upstream water level Ha, and an opening area A of the orifice hole.

The meaning of the above will be described with reference to FIG. 11. FIG. 11 illustrates a state that the effective water level H, the flow speed V, and the discharge flow rate Qb from the orifice hole are obtained in the conditions having the flow rate Qa from the upstream side, the upstream water level Ha, and the opening area A of the orifice hole. The upstream water level Ha is the utmost priority issue to maintain the waterway functions. The water level is not allowed to exceed the maximum allowable water depth Hb. Height increasing of the upstream waterway becomes necessary in a case to increase the power generation amount as required.

Next, states of the hydraulic power generating apparatus in a water-increasing time and a water-decreasing time without adjusting the opening area of the orifice hole will be described with reference to FIG. 12. In a water-increasing time, a flow rate +Qc obtained by the upstream water level He exceeding Hb overflows over the water collecting plate 6 not to be used for power generation. Accordingly, the upstream water level He in a water-increasing time is not allowed to exceed Hb. On the other hand, in a water-decreasing time, the upstream water level He is decreased, and then, the effective water level difference H is also decreased consequently. Accordingly, the power generation efficiency of the hydraulic power generating apparatus is lowered owing to double decreases being a decrease of the power generation amount Qa and a decrease of H to be in an adverse state in which the total power generation amount is decreased.

Figure 13:
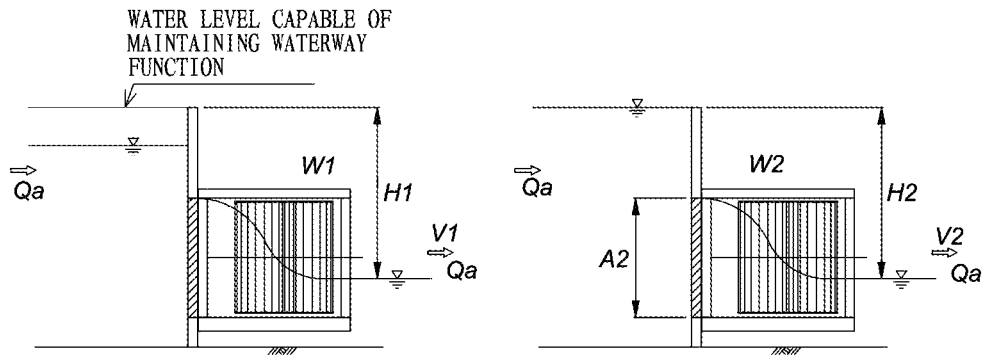
FIG. 13 is an explanatory view for state variation of an upstream water level when opening area of the orifice hole is changed from A1 to A2 in a water-decreasing time.
Figure 14:
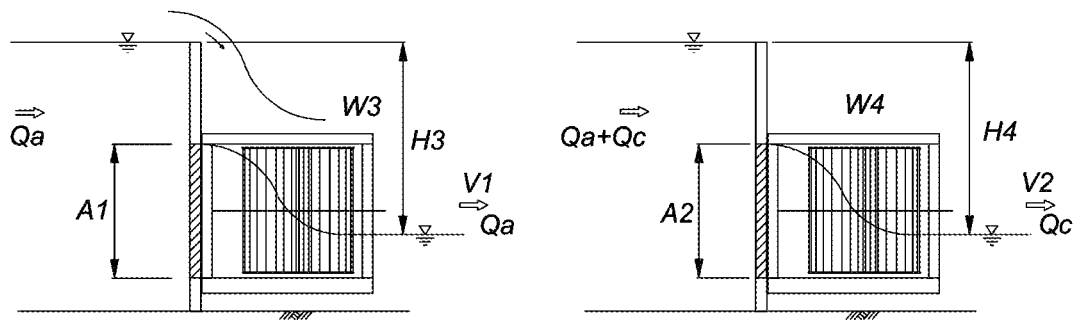
FIG. 14 is an explanatory view for state variation of the upstream water level when the opening area of the orifice hole is changed from A1 to A2 in a water-increasing time.

In the following, description is performed on a fact that the hydraulic power generating apparatus of the present invention can change the upstream water level by adjusting the opening area of the orifice hole in such a water-decreasing time and a water-increasing time with reference to FIGS. 13 and 14. First, in a water-decreasing time as illustrated in FIG. 13, when the opening area of the orifice hole is changed from A1 to A2, theoretical power generation amounts are respectively to be W1=Qa×g×H1 and W2=Qa×g×H2. Naturally, the power generation amount W2 being larger than W1 can be obtained. The reason why the power generation amount W2 can be obtained is that the opening area of the orifice hole can be changed from A1 to A2. That is, in this case, it is simply required to reduce the discharge flow rate from the orifice hole so as to heighten the water face to the water level at which the waterway functions can be maintained. That is, it is simply required to move the movable gate 5 in the closing direction to lessen the opening area of the orifice hole. As long as the opening area A2 of the orifice hole can maintain H2, the power generation amount being W2 can be obtained.

Similarly, as long as the opening area of the orifice hole can be enlarged so that the overflowing flow rate +Qc in a water-increasing time can be utilized for power generation, the power generation amount is increased. In this case, it is simply required to increase the discharge flow rate from the orifice hole to provide the water level at which the overflowing flow rate +Qc is prevented from overflowing. That is, it is simply required to move the movable gate 5 in the opening direction to enlarge the opening area of the orifice hole. In this case, power generation amounts are W3=Qa×g×H3 and W4=(Qa+Qc)×g×H4. With the above, the maximum power generation amount is improved without causing overflow due to the upstream water level.

As described above, in the hydraulic power generating apparatus of the present invention, since the opening area of the orifice hole can be adjusted by opening and closing the movable gate, it is possible to increase the power generation amount without decreasing the hydraulic power generation efficiency and to provide the flow rate adjusting function. Further, since water flowing toward the vertical axis turbine can be stopped by completely closing the movable gate, the maintenance operation can be easily performed.

Figure 15:
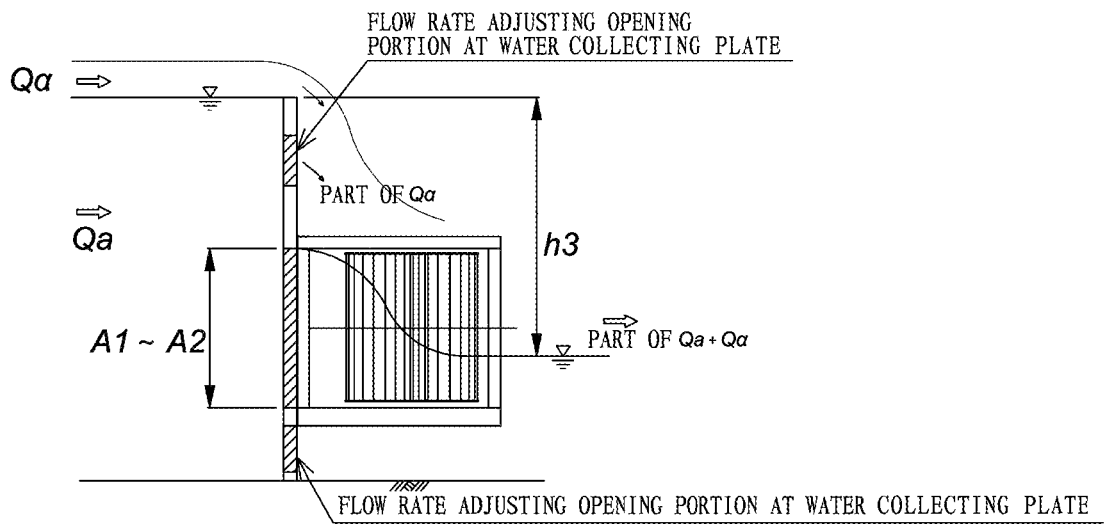
FIG. 15 is an explanatory view when adjusting the upstream water level in a water-increasing time by utilizing a water collecting plate of another embodiment.

Here, there may be a case that the overflowing cannot be prevented only by enlarging the opening area of the orifice hole with a large increased-water amount. In such a case, it is also possible to adopt a structure that a flow rate adjusting opening portion at the water collecting plate is disposed to the water collecting plate 6 as illustrated in FIG. 15 to discharge overflow water from the opening portion to the downstream side. Alternatively, it may also adopt a structure that an open-close door (not illustrated) is disposed to the water collecting plate 6 to discharge overflow water at the upstream side of the waterway to the downstream side without passing through the flow path by adjusting opening degree of the open-close door in accordance with water level variation in the waterway.

Figure 16:
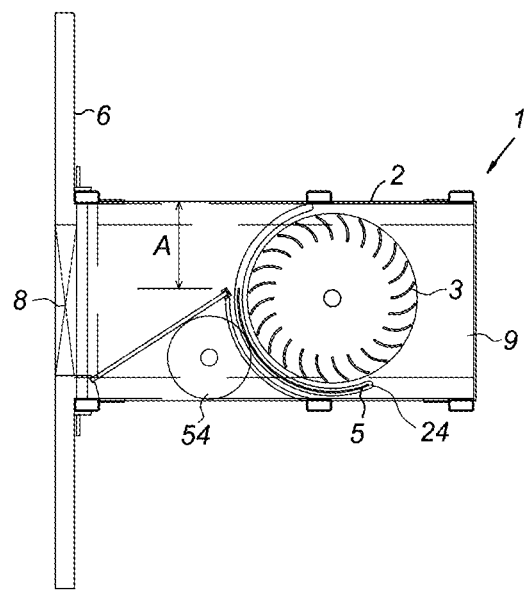
FIG. 16 is a plane view of a hydraulic power generating apparatus using a vertical axis turbine of a single axis type of another embodiment of the present invention.
Figure 16:
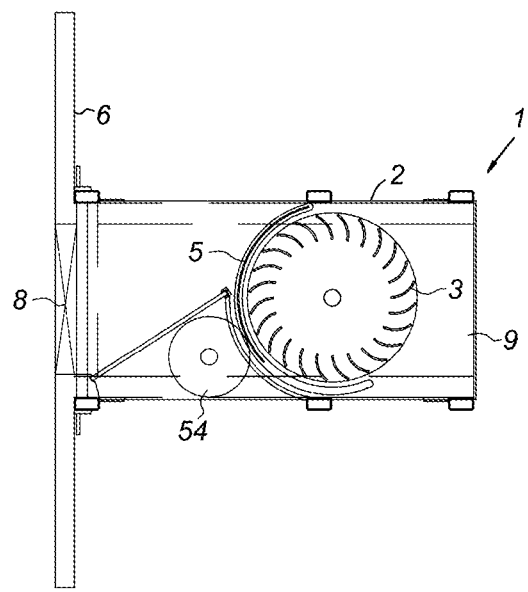

The abovementioned hydraulic power generating apparatus 1 adopts the vertical axis turbines 3, 3 being a dual axis type. However, it is also possible to adopt the vertical axis turbine 3 being a single axis type as illustrated in FIG. 16. FIG. 16 illustrates an opened state and a closed state of the movable gate 5 in the hydraulic power generating apparatus 1 which adopts the vertical axis turbine 3 of a single axis type. Here, the same numeral is given to the same functional and structure as that in the hydraulic power generating apparatus 1. Since the structure and operation are approximately the same as the above, detailed description thereof is omitted.

Figure 17:
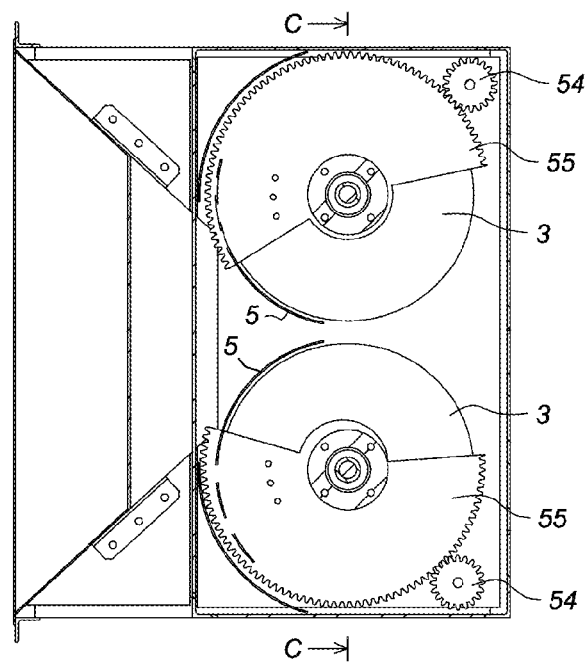
Figure 17:
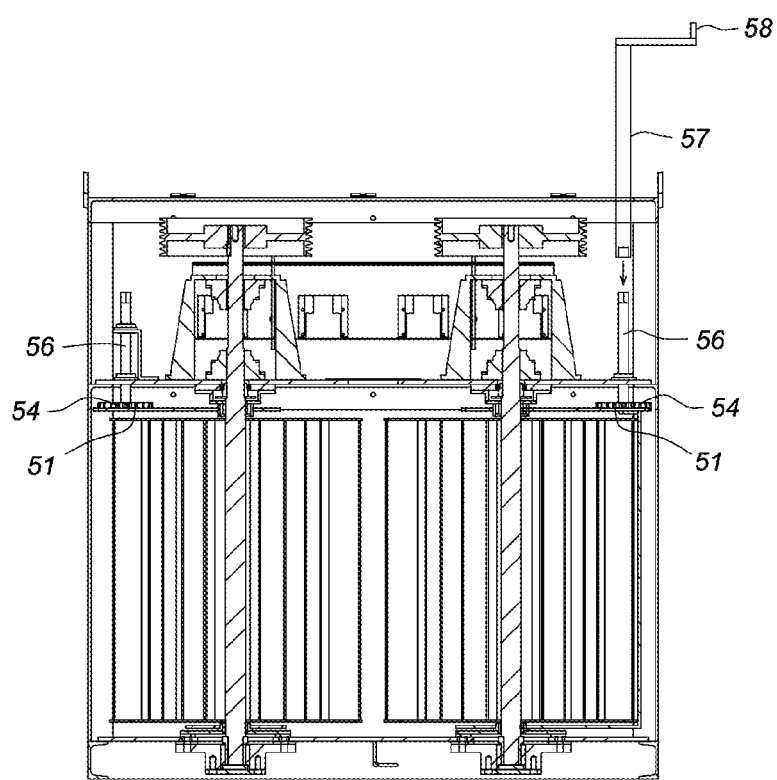

Here, not limited to the above, for example, a structure to dispose a gear to the downstream side as illustrated in FIG. 17 may be adopted as the open-close structure of the movable gate 5.

In the hydraulic power generating apparatus 1, the movable gate 5 includes a semicircular upper plate 55 of a main body portion 51 having a tooth profile formed therearound as being different from the embodiment. Further, as illustrated in FIG. 17(a), a part of the upper plate 55 is connected to the main body portion. The tooth profile portion of the upper plate 55 is engaged with the gear 54, so that the upper plate 55 is rotated as being interlocked when the gear 54 is rotated. Thus, similarly to the embodiment, the movable gate 5 is to be opened and closed.

In the present embodiment, a handle 57 is utilized for a method of rotating the gear 54. That is, the gear 54 is to be rotated by rotationally operating a grip portion 58 of the handle 57 as the top end of the handle 57 being fitted to the upper end of a rotating shaft 56 of the gear 54.

Here, not limited to the abovementioned embodiments, various embodiments as described in the following can be adopted for the present invention without departing from the scope of the present invention.

Figure 18:
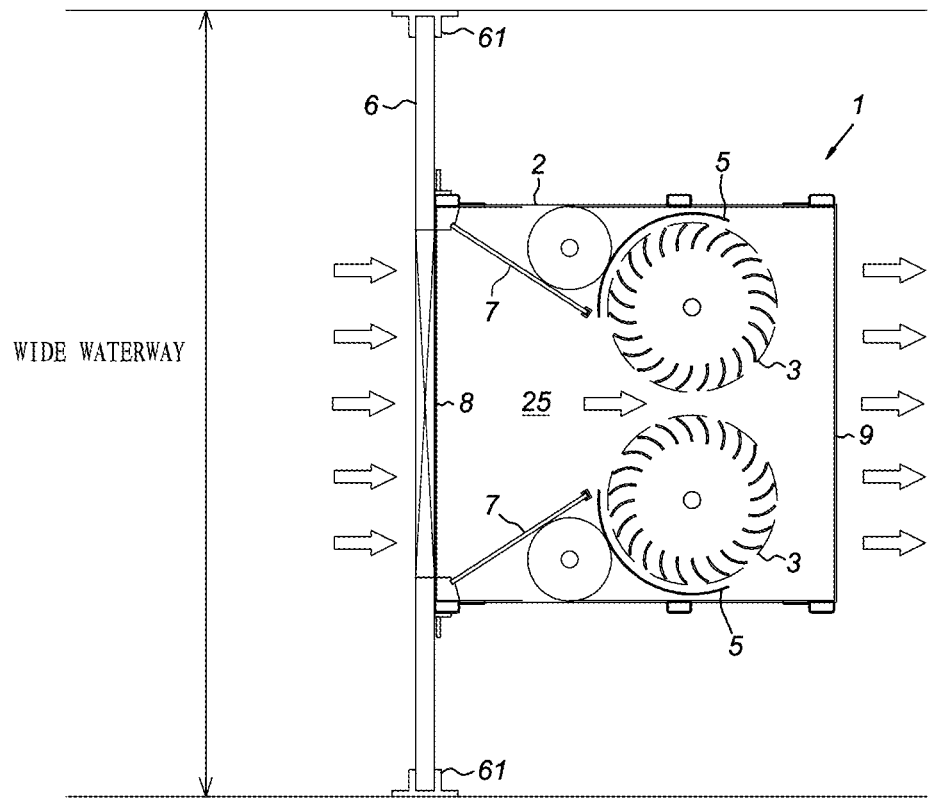
FIG. 18 is an explanatory view illustrating an example that the hydraulic power generating apparatus of the present invention is installed to a wide waterway.

For example, the structure of the water collecting plate 6 can be modified as being adapted to situations of a waterway to which the hydraulic power generating apparatus 1 is installed. As illustrated in FIG. 18, when the hydraulic power generating apparatus 1 is installed to a wide waterway, both end sections of the water collecting plate 6 are fixed to both walls of the waterway with fixing brackets 61. In this case, the water collecting plate 6 functions also as means to connect and fix the housing 2 to the waterway in addition to means to intercept and accumulate water flowing through the waterway.

Figure 19:
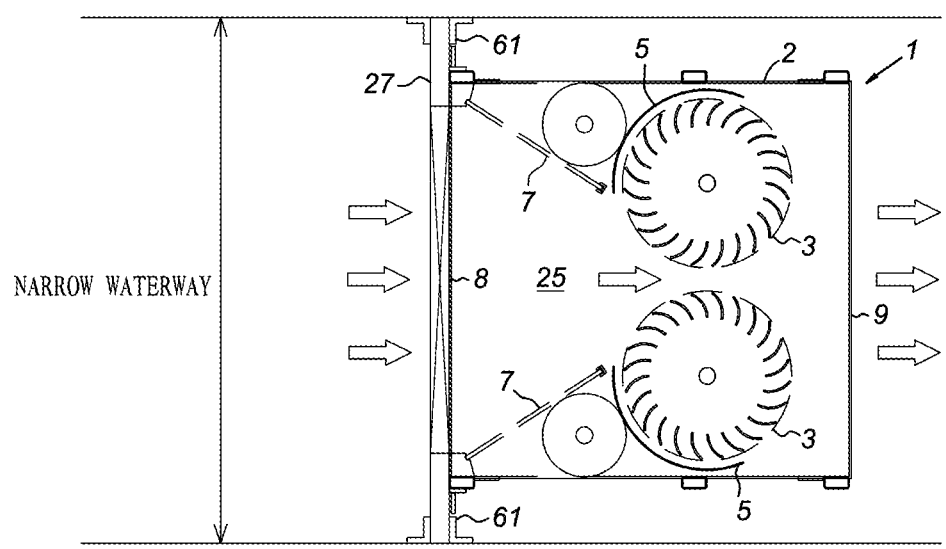
FIG. 19 is an explanatory view illustrating an example that the hydraulic power generating apparatus of the present invention is installed to a narrow waterway.

In contrast, as illustrated in FIG. 19, when the hydraulic power generating apparatus 1 is installed to a narrow waterway, both end sections of the housing 2 are directly fixed to both walls of the waterway with the fixing brackets 61. In this case, a front plate 27 of the housing 2 performs both a function of fixing means and a function of the water collecting plate 6.

Figure 20:
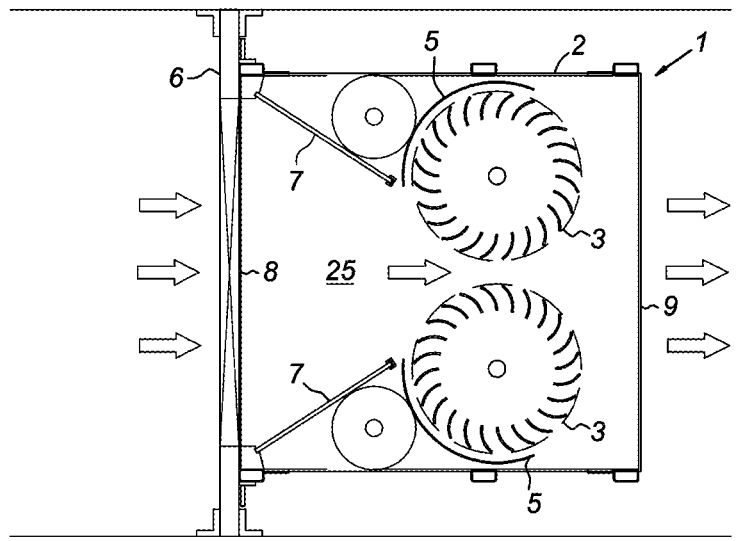
FIG. 20 is an explanatory view illustrating a function of a water collecting plate when the hydraulic power generating apparatus of the present invention is installed to a narrow waterway without level difference as FIG. 20(a) being a plane view and FIG. 20(b) being a cross-sectional view.
Figure 20:
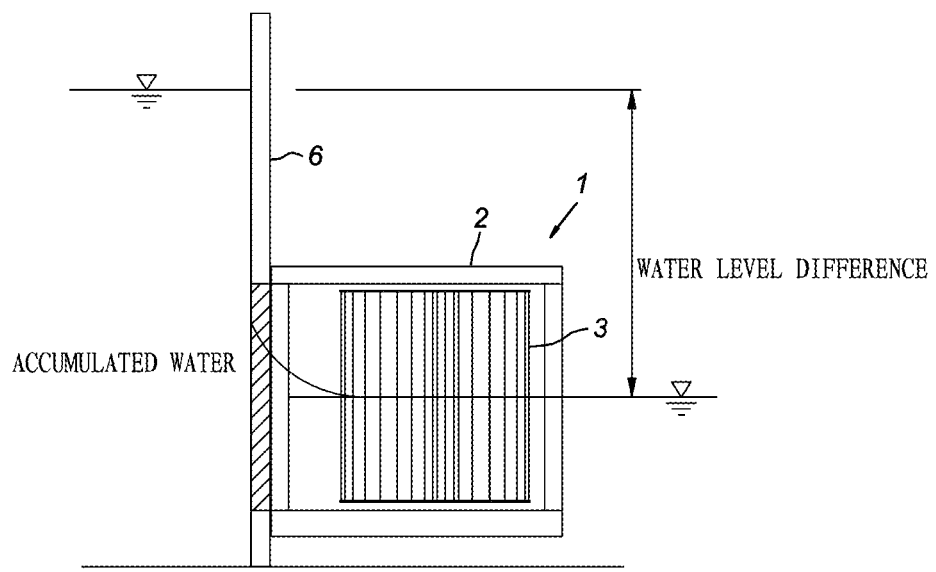

Further, as illustrated in FIG. 20, in a case of being installed to a narrow waterway without having level difference, the water collecting plate 6 heightens the water level at the upstream side and produces a head in the waterway by intercepting and accumulating water flowing through the waterway. The above provides a function that positional energy generated by the head acts to the vertical axis turbine 3 in the housing 2.

Figure 21:
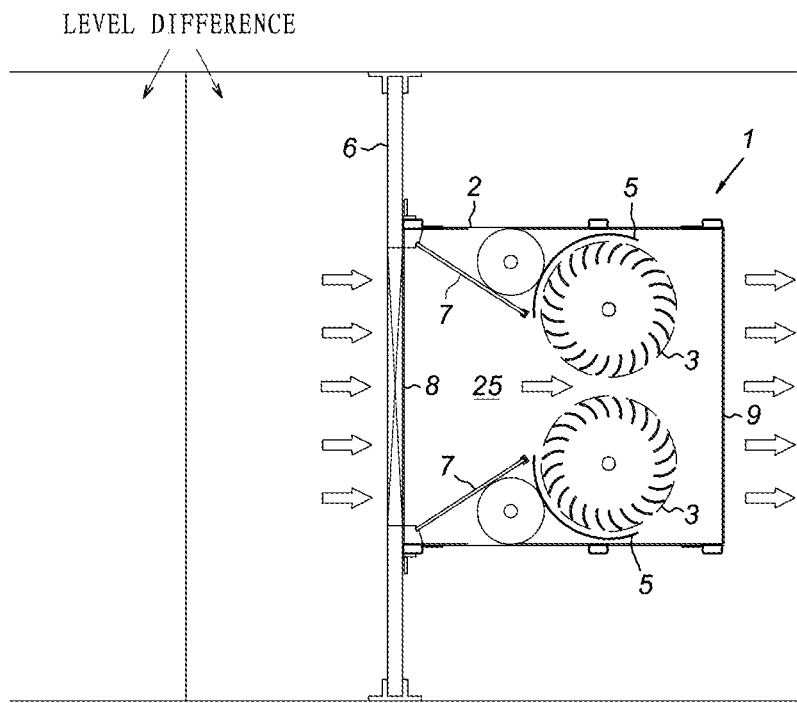
FIG. 21 is an explanatory view illustrating a function of a water collecting plate when the hydraulic power generating apparatus of the present invention is installed to a wide waterway having level difference as FIG. 21 (a) being a plane view and FIG. 21(b) being a cross-sectional view.
Figure 21:
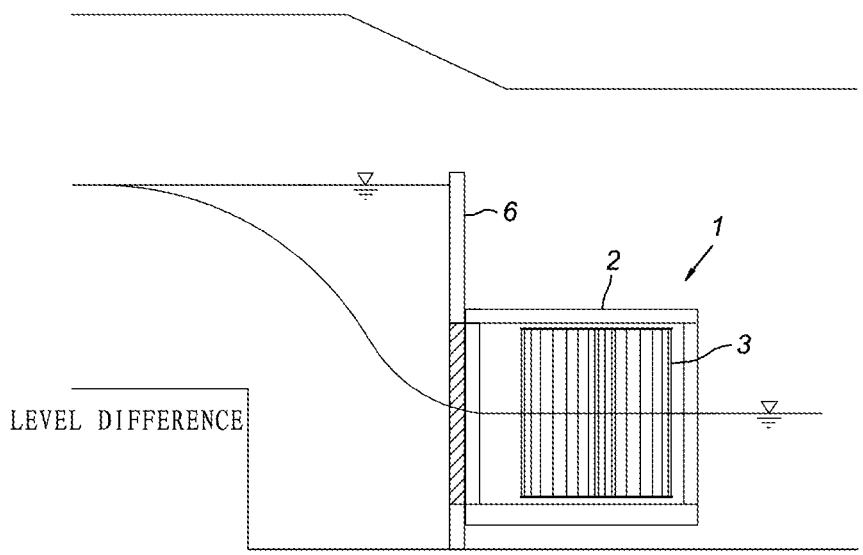

Further, in a case with a wide waterway having level difference as illustrated in FIG. 21, larger energy can act to the vertical axis turbine 3 by utilizing a head of water flowing down at the level difference portion when the housing 2 is installed to the downstream side of the level difference portion.

Figure 22:
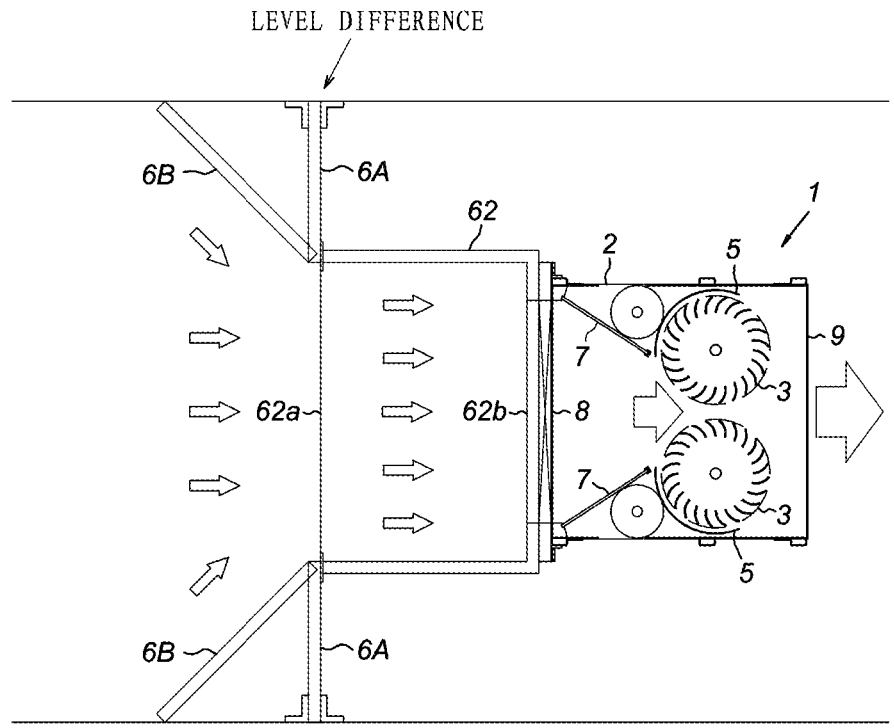
FIG. 22 is an explanatory view of a modified example of the water collecting plate when the hydraulic power generating apparatus of the present invention is installed to a wider waterway.

Furthermore, in a case of being installed to a wider waterway, a water-intake box 62 may be placed to the level difference portion of the waterway as illustrated in FIG. 22. Here, it is simply required that the water collecting plate 6 is attached to a water-intake opening 62*a* of the water-intake box 62 and that the housing 2 of the hydraulic power generating apparatus 1 is attached to a discharge opening 62*b* thereof. In this case, the water collecting plate 6 is formed to be a water collecting plate 6A oriented as being perpendicular to the flow in the waterway or to be a water collecting plate 6B oriented as being oblique at a predetermined angle against the flow in the waterway. With the above, the water collecting plate 6 performs a function to collect water flowing at the upstream side into the water-intake box 62 located at the center in addition to producing a head by heightening the water level at the upstream side.

Further, not being essential for the hydraulic power generating apparatus 1 of the present invention, it is also possible that a discharging function is provided to the acceleration plate 7 as an additional function as described below.

Figure 23:
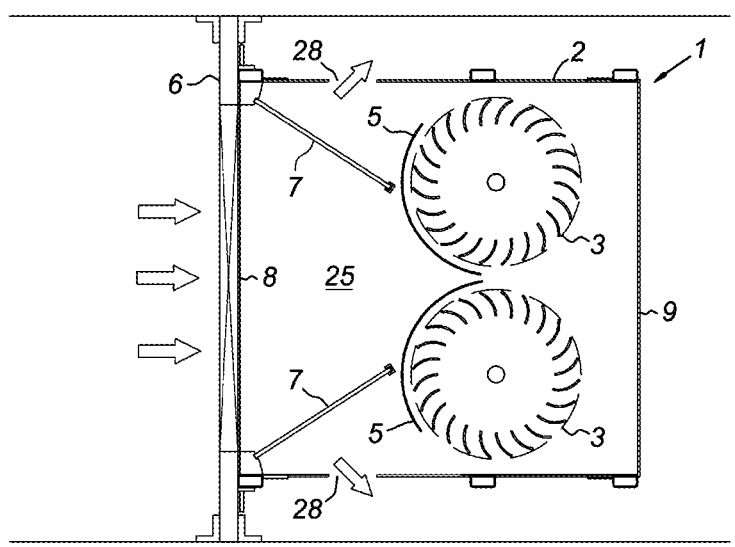
FIG. 23 is an explanatory plane view for a discharging function of an acceleration plate in the hydraulic power generating apparatus of the present invention.

That is, in the hydraulic power generating apparatus 1 illustrated in FIG. 23, the acceleration plate 7 is structured with a lift type sluice gate and discharge holes 28, 28 through which water passes are formed at the side plates 23, 23 at both sides of the housing 2. Accordingly, when the acceleration plates 7, 7 are lifted in the vertical direction in a state that the movable gates 5, 5 are closed as illustrated in the drawing, the water in the flow path 25 is to be discharged to the outside of the housing 2 as passing through the discharge holes 28 from interspace against the bottom plate 22. Therefore, even if the hydraulic power generating apparatus 1 remains installed to the waterway, maintenance operation of components such as the vertical axis turbine 3 in the housing 2 and the generator 4 can be performed without stopping water flow in the waterway.

Figure 24:
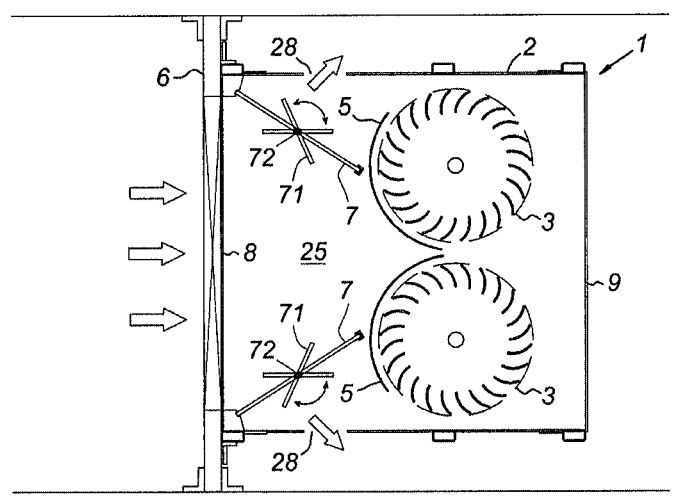
FIG. 24 is a plane view illustrating a modified example of the acceleration plate in the hydraulic power generating apparatus of the present invention.

Further, it is also possible to adopt a structure as illustrated in FIG. 24 as a modified example of the acceleration plate 7. The acceleration plate 7 is a rotary gate having a rotary type open-close door 71. The open-close door 71 is placed at the center of the acceleration plate 7. The open-close door 71 is supported rotatably in an arrow direction in the drawing about a vertical shaft 72. In this case as well, when the open-close door 71 of the acceleration plate 7 is opened as being rotated in a state that the movable gates 5, 5 are closed, the water in the flow path 5 can be discharged to the outside of the housing 2 through the discharge hole 28. Here, not limited to the above structure, the acceleration plate 7 having the discharging function can adopts a slide gate (not illustrated) of a single acting type or a double acting type capable of opening and closing in the horizontal direction.

DESCRIPTION OF REFERENCE SIGNS

1 Hydraulic power generating apparatus
2 Housing
21 Top plate
22 Bottom plate
23 Side plate
24 Slide groove
25 Flow path
26 Bearing
27 Front plate
28 Discharge hole
3 Vertical axis turbine
31 Rotating shaft
32 Pulley
33 Rotor blade
4 Generator
41 Drive shaft
42 Pulley
43 Belt
5 Movable gate
51 Main body portion
52 Tooth portion
53 Bearing
54 Gear
55 Upper plate
56 Rotating shaft
57 Handle
58 Grip portion
6 Water collecting plate
61 Fixing bracket
62 Water-intake box
7 Acceleration plate
71 Open-close door
72 Vertical shaft
8 Water inflow opening
9 Water outflow opening
A Orifice hole (Flow cross-sectional area)

Figure 12:
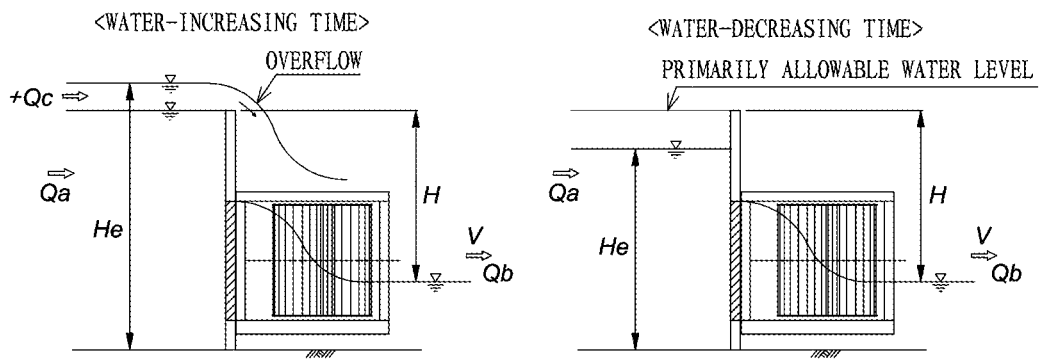
FIG. 12 is an explanatory view for states of the hydraulic power generating apparatus when water is increased in the waterway and water is decreased therein.

FIG. 1
UPSTREAM SIDE
DOWNSTREAM SIDE
FIG. 5(a)
OPENED STATE
UPSTREAM SIDE
DOWNSTREAM SIDE
FIG. 5(b)
CLOSED STATE
UPSTREAM SIDE
DOWNSTREAM SIDE
FIG. 9
NORMAL TIME
WATER-DECREASING TIME
WATER IS DECREASED
FIG. 10
MAXIMUM ALLOWABLE WATER DEPTH
MAXIMUM PLANNED WATER DEPTH
NORMAL OR PRACTICAL WATER LEVEL
FIG. 12
WATER-INCREASING TIME
OVERFLOW
WATER-DECREASING TIME
PRIMARILY ALLOWABLE WATER LEVEL
FIG. 13
WATER LEVEL CAPABLE OF MAINTAINING WATERWAY FUNCTION
FIG. 15
FLOW RATE ADJUSTING OPENING PORTION AT WATER COLLECTING PLATE
PART OF Qα
PART OF Qa+Qα
FIG. 18
WIDE WATERWAY
FIG. 19
NARROW WATERWAY
FIG. 20(a)
WITHOUT LEVEL DIFFERENCE
FIG. 20(b)
ACCUMULATED WATER
WATER LEVEL DIFFERENCE
FIG. 21(a)
LEVEL DIFFERENCE
FIG. 21(b)
LEVEL DIFFERENCE
FIG. 22
LEVEL DIFFERENCE

The invention claimed is:
1. A hydraulic power generating apparatus to perform power generation when installed in a waterway having flow, comprising:
a housing which includes a water inflow opening located at an upstream side of the waterway, a water outflow opening located at a downstream side thereof, and a flow path providing communication from the water inflow opening to the water outflow opening;
a water collecting plate which is disposed to an opening edge of the water inflow opening of the housing and which collects water into the water inflow opening while intercepting and accumulating water flowing through the waterway;
a pair of vertical axis turbines, each rotatably supported adjacent to one another in the flow path of the housing and having rotor blades;
a generator which generates power by receiving rotational force from the vertical axis turbines;

a pair of arc-shaped gates, each gate having gate gears connected thereto, and each gate being rotatably attached to one of the vertical axis turbines, wherein the pair of gates define a flow path opening area therebetween; and a pair of drive gears, each drive gear mated with one of the gate gears;

wherein rotation of the drive gears rotates the gates between (i) a first position in which the flow path opening area has a first flow width, (ii) a second position in which the flow path opening area has a second flow width less than the first flow width, and (iii) a third position in which a portion of each of the arc-shaped gates engage with one another to inhibit water from passing through the housing such that the flow path opening area has a third flow width of approximately zero.

2. The hydraulic power generating apparatus according to claim 1, wherein the movable gates are configured to open and close in a direction perpendicular to the flow path to change the flow cross-sectional area.

3. The hydraulic power generating apparatus according to claim 1, further comprising an acceleration plate arranged in the housing to accelerate water flow in the flow path by gradually reducing opening area of the water inflow opening.

4. The hydraulic power generating apparatus according to claim 3, wherein the acceleration plate is (i) a sluice gate capable of being lifted in the vertical direction, (ii) a slide gate capable of being opened and closed in the horizontal direction, or (iii) a rotary gate capable of being rotated about a vertical axis, wherein the acceleration plate is capable of discharging water in the flow path from a discharge hole formed at the housing to the outside of the housing by opening the gate.

5. The hydraulic power generating apparatus according to claim 1, wherein an open-close door is disposed on the water collecting plate and is capable of discharging overflow water at the upstream side of the waterway to the downstream side without passing through the flow path by opening the open-close door.

6. The hydraulic power generating apparatus according to claim 1, wherein the vertical axis turbine is an oppositely-arranged dual axis cross-flow turbines.

7. The hydraulic power generating apparatus according to claim 1, wherein the movable gates are rotatably mounted to respective central shafts of the vertical axis turbines and are configured to open and close along an outer circumference of the rotor blades.

8. The hydraulic power generating apparatus according to claim 1, wherein the moveable gates each have a partial-circular cross-section and are each concentric with one of the vertical axis turbines.

9. The hydraulic power generating apparatus of claim 8, wherein the moveable gates are rotatably mounted to respective vertical shafts that extends along central axes of the vertical axis turbines.

10. The hydraulic power generating apparatus according to claim 1, further comprising an acceleration plate arranged in the housing to accelerate water flow in the flow path by gradually reducing opening area of the water inflow opening, the acceleration plate having a rotary gate capable of being rotatably opened and closed about a vertical axis to selectively discharge water in the flow path from a discharge hole formed at the housing to the outside of the housing.

11. The hydraulic power generating apparatus according to claim 1, wherein the arc-shaped gates are each cylindrical segments concentric with and are associated with one of the vertical axis turbines, wherein the gates rotate in opposite directions between the first, second and third positions to influence rotation of the turbines rotating in opposite directions.

12. The hydraulic power generating apparatus according to claim 1, further comprising a pair of acceleration plates arranged in outer regions of the housing to accelerate water flow in the flow path by gradually reducing a width of the flow path, wherein the acceleration plates each cooperate with one of the arc-shaped gates to prevent water from passing through the housing when the gates are in the third position.

13. The hydraulic power generating apparatus according to claim 1, wherein the pair of gates each include external teeth that engage with one another when the gates are in the third position.

14. A hydraulic power generating apparatus to perform power generation when installed in a waterway having flow, comprising:

a housing which includes a water inflow opening located at an upstream side of the waterway, a water outflow opening located at a downstream side thereof, and a flow path providing communication from the water inflow opening to the water outflow opening;

a pair of counter-rotatable vertical axis turbines located proximate to one another, each turbine rotatably supported in the flow path of the housing;

a generator which generates power by receiving rotational force from each of the counter-rotating the vertical axis turbines;

a pair of arc-shaped gates, each gate having gate gears connected thereto, and each gate being rotatably attached to one of the vertical axis turbines, wherein the pair of gates define a flow path opening area therebetween; and a pair of drive gears, each drive gear mated with one of the gate gears;

wherein rotation of the drive gears rotates the gates between (i) a first position in which the flow path opening area has a first flow width, and (ii) a second position in which the flow path opening area has a second flow width less than the first flow width.

15. The hydraulic power generating apparatus according to claim 14, wherein further rotation of the drive gears rotates the gates to (iii) a third position in which a portion of each of the arc-shaped gates engage with one another to inhibit water from passing through the housing such that the flow path opening area has a third flow width of approximately zero.

16. The hydraulic power generating apparatus according to claim 15, wherein the pair of gates each include external teeth that engage with one another when the gates are in the third position.

* * * * *